(12) United States Patent
Liu et al.

(10) Patent No.: US 8,430,316 B2
(45) Date of Patent: Apr. 30, 2013

(54) IMAGING-BASED READER HAVING SMART ILLUMINATION

(75) Inventors: Rong Liu, Selden, NY (US); Eugene Joseph, Coram, NY (US); Ming Yu, S. Setauket, NY (US)

(73) Assignee: Symbol Technologies, Inc., Holtsville, OH (US)

( * ) Notice: Subject to any disclaimer, the term of this patent is extended or adjusted under 35 U.S.C. 154(b) by 1255 days.

(21) Appl. No.: 11/998,764

(22) Filed: Nov. 30, 2007

(65) Prior Publication Data

US 2009/0140052 A1   Jun. 4, 2009

(51) Int. Cl.
*G06K 7/10* (2006.01)

(52) U.S. Cl.
USPC .................................................... 235/462.32

(58) Field of Classification Search ............. 235/472.01, 235/472.02, 472.03, 462.01–462.45
See application file for complete search history.

(56) References Cited

U.S. PATENT DOCUMENTS

| 5,378,883 A | 1/1995 | Batterman et al. |
| 6,595,422 B1 * | 7/2003 | Doljack .................... 235/462.42 |

* cited by examiner

*Primary Examiner* — Thien M Le (57) ABSTRACT

A method and imaging assembly (10) are disclosed adapted for reading a target object comprising a scan engine (48) having a sensor (46), focusing optics (44), and an imager (48). The scan engine includes a field-of-view defining an area to be imaged by the imaging assembly (10). A housing (80) internally lodges the scan engine (48) and an illumination source (36). The illumination source (36) is adapted to project illumination from the housing (80). A boot (30) extends from the housing (80) for shaping the illumination as it passes through the boot to form an illumination pattern from the illumination. The illumination pattern substantially conforms to a geometrical shape of the boot (30) and is adapted to envelope the scan engine field-of-view.

20 Claims, 10 Drawing Sheets

IMAGING-BASED READER HAVING SMART ILLUMINATION

TECHNICAL FIELD

The present invention relates to an illumination system for an imaging reader and, more particularly, to an illumination system for an imaging reader including smart illumination that provides a visually defined and prescribed field-of-view in a direction toward a target object for imaging.

BACKGROUND

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Uniform Product Code (UPC), typically used in retail stores sales; Code 39, primarily used in inventory tracking; and Postnet, which is used for encoding zip codes for U.S. mail. Systems that read and decode bar codes employing charged coupled device (CCD) or complementary metal oxide semiconductor (CMOS) based imaging systems are typically referred to hereinafter as imaging systems, imaging-based bar code readers, imaging readers, or bar code scanners.

Imaging systems electro-optically transform the graphic indicia into electrical signals, which are decoded into alpha-numerical characters that are intended to be descriptive of the article or some characteristic thereof. The characters are then typically represented in digital form and utilized as an input to a data processing system for various end-user applications such as point-of-sale processing, inventory control, and the like.

Imaging-based bar code reader systems that include CCD, CMOS, or other imaging configurations comprise a plurality of photosensitive elements (photosensors) or pixels typically aligned in an array pattern that could include a number of arrays. The imaging-based bar code reader systems employ light emitting diodes (LEDs) or other light sources for illuminating a target object, e.g., a target bar code. Light reflected from the target bar code is focused through a lens of the imaging system onto the pixel array. As a result, the focusing lens generates an image from its field-of-view (FOV) that is projected onto the pixel array. Periodically, the pixels of the array are sequentially read out, creating an analog signal representative of a captured image frame. The analog signal is amplified by a gain factor, by for example an operational amplifier or microprocessor. The amplified analog signal is digitized by an analog-to-digital converter. Decoding circuitry of the imaging system processes the digitized signals representative of the captured image frame and attempts to decode the imaged bar code.

SUMMARY

One example embodiment of the present disclosure includes an imaging assembly capable of reading a target object comprising a scan engine having a sensor, focusing optics, and an imager. The scan engine includes a field-of-view that defines an area to be imaged by the imaging assembly. A housing internally lodges the scan engine and an illumination source. The illumination source is adapted to project illumination from the housing. A boot extends from the housing for shaping the illumination as it passes through the boot to form an illumination pattern from the illumination. The illumination pattern substantially conforms to a geometrical shape of the boot and is adapted to envelope the scan engine field-of-view.

Another example embodiment of the present disclosure includes a method of imaging a target object comprising projecting a field-of-view from a scan engine located in a housing of an imaging assembly and projecting illumination from an illumination source located within the housing to a location outside of the housing by passing the illumination through a boot extending from the housing. The method further comprises shaping the illumination from the illumination source to form an illumination pattern as it passes through the boot. The illumination pattern has a substantially similar shape as the boot. The illumination pattern further envelops the field-of-view such that the illumination pattern is at a fixed offset location relative to the field-of-view.

A further example embodiment of the present disclosure includes a method of imaging a target object comprising projecting an imaging field-of-view from a scan engine located in a housing of an imaging assembly and projecting illumination from an illumination means located within the housing to a location outside of the housing by passing the illumination through a baffling means extending from the housing. The method further comprises shaping the illumination from the illumination means by redirecting and diffusing at least a portion of the light projected from the illumination means to form an illumination pattern as it passes through the baffling means. The illumination pattern has a substantially similar shape as the baffling means. The illumination pattern further envelops the field-of-view such that the illumination pattern is at a fixed offset location relative to the field-of-view.

Yet a further example embodiment of the present disclosure includes a hand-held image scanner used for reading target objects comprising a scan engine having a sensor and imager. The scan engine has a field-of-view defining an area to be imaged by the image scanner. The hand-held image scanner further comprises a housing internally lodging the scan engine and an illumination source. The illumination source is adapted to project illumination from the housing. A boot extends from the housing for shaping an illumination pattern from the illumination as it passes through the boot. The illumination pattern forms a fixed envelop distance about at least a portion of the perimeter of the scan engine field-of-view.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, in which.

DETAILED DESCRIPTION

Figure 1:
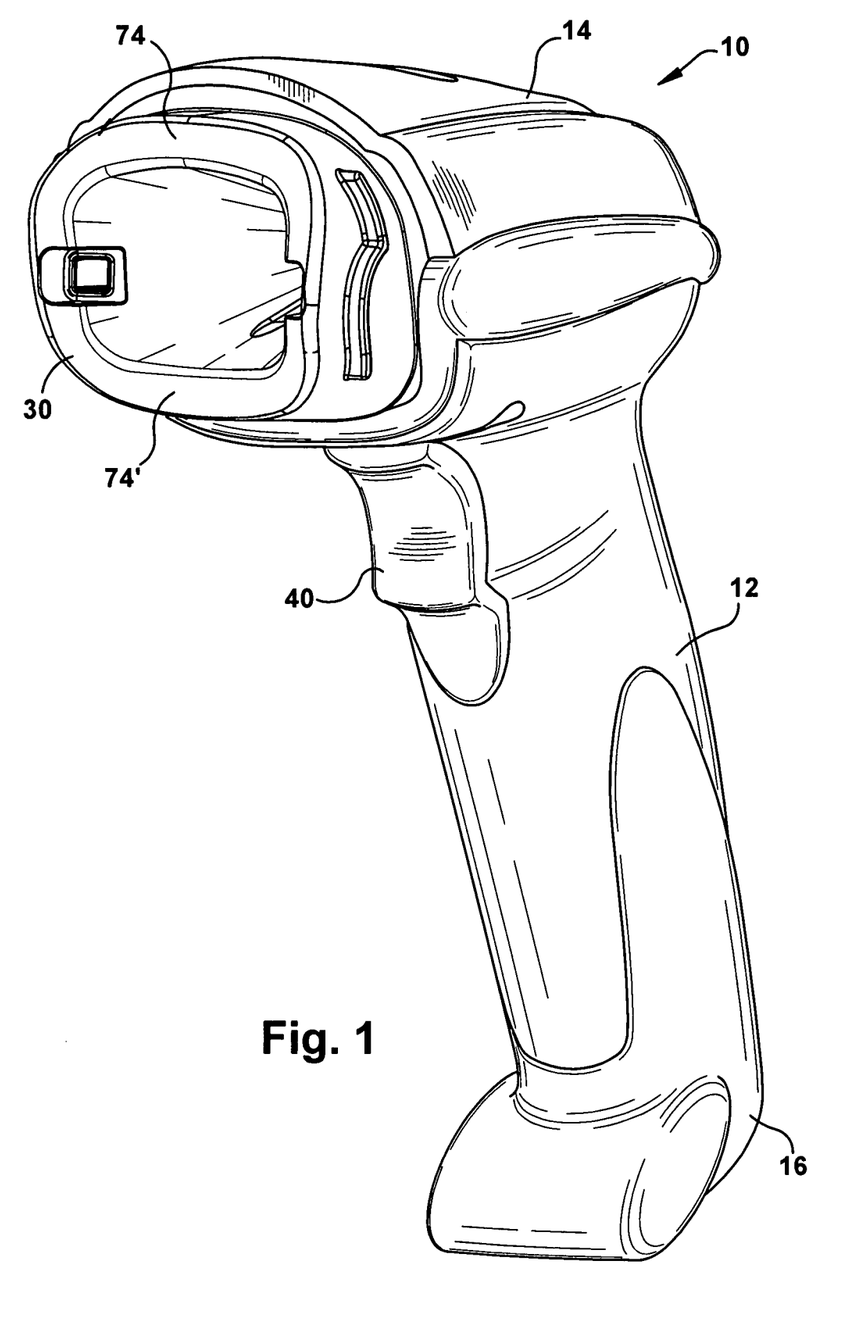
FIG. 1 is a perspective view of an imaging reader constructed in accordance with one embodiment of the disclosure.
Figures 2, 3:
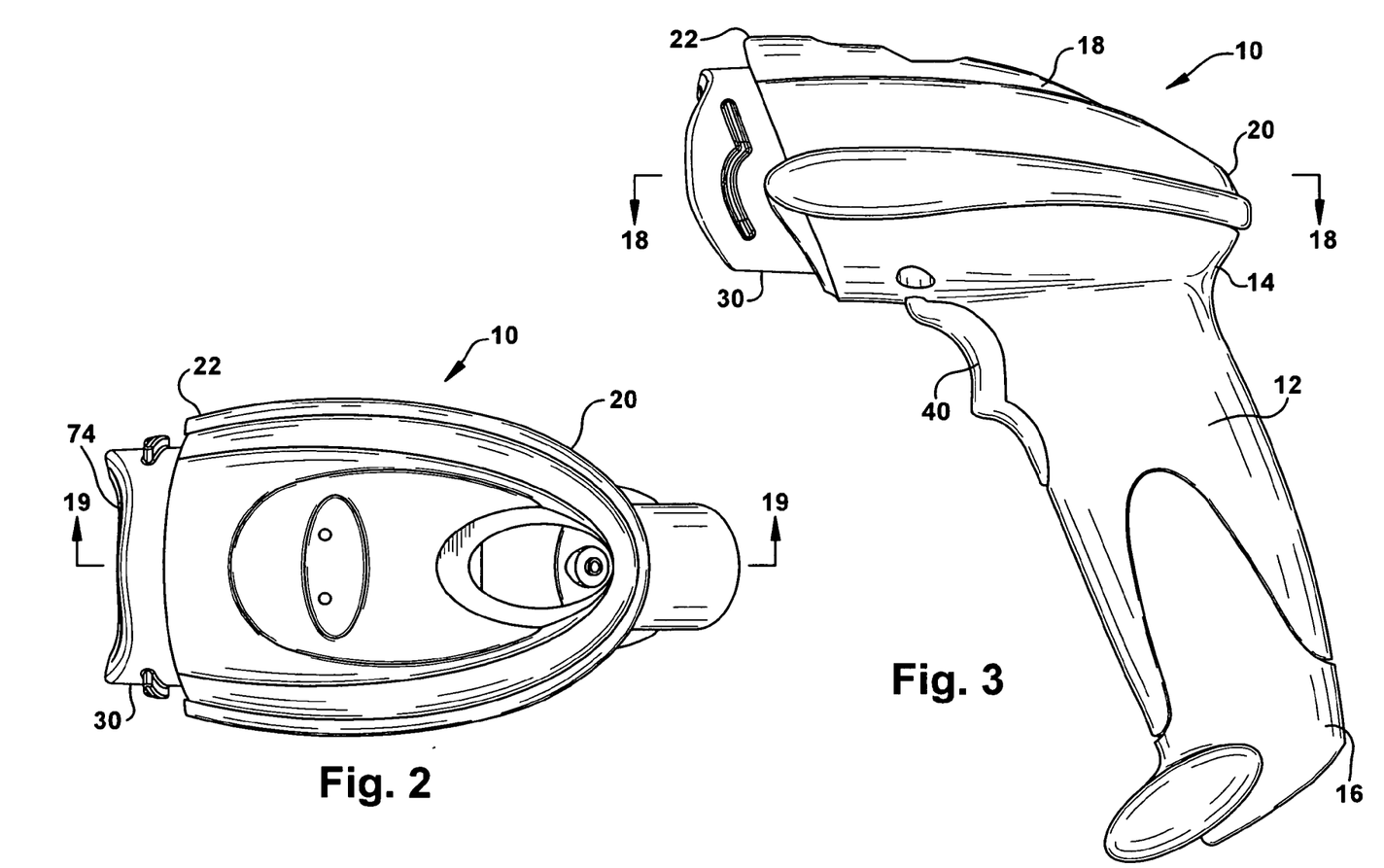
FIG. 2 is a top view of the imaging reader of FIG. 1.
FIG. 3 is a side view of the imaging reader of FIG. 1.
Figure 4:
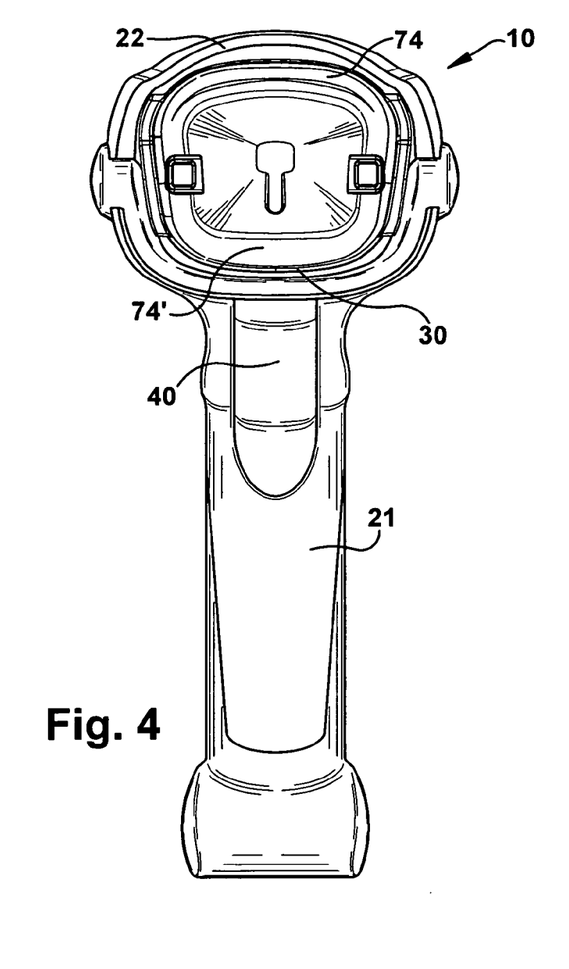
FIG. 4 is an elevated front view of the imaging reader of FIG. 1.

An elevated perspective view of an imaging reader 10 is depicted in FIG. 1. The imaging reader 10 is a portable scanner in the illustrated embodiment of FIG. 1, employing an internal power source such as a battery, but could just as easily be a reader having a wire connection from which power is supplied, or remotely powered through an induction system without departing from the spirit and scope of the claimed invention. In addition to imaging and decoding 1D and 2D bar codes, including for example postal codes, and Code 39 bar codes, the reader 10 is also capable of capturing images and signatures. In one example embodiment, the imaging reader 10 is a hand held portable scanner that can be carried and used by a user walking or riding through a store, warehouse, or plant, while reading various symbology codes for stocking and inventory control purposes. However, it should be recognized that the imaging reader 10 of the present invention, to be explained below, may be advantageously used in connection with any type of imaging-based automatic identification system including, but not limited to, bar code scanners, signature imaging acquisition and identification systems, optical character recognition systems, fingerprint identification systems, and the like. It is the intent of the present invention to encompass all such imaging-based automatic identification systems.

Figures 5A, 5B, 6:
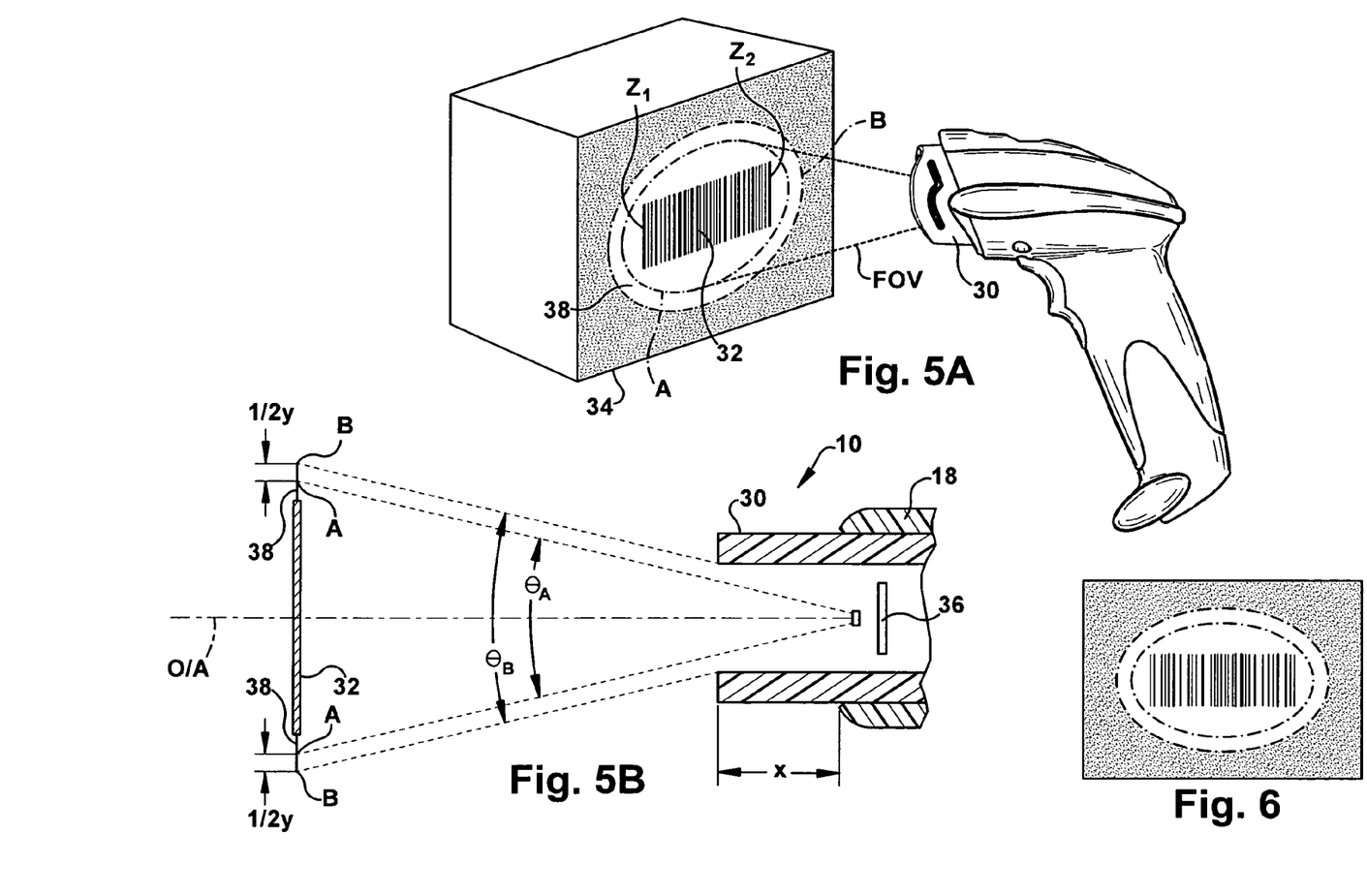
FIG. 5A is a side view of the imaging reader of FIG. 1 reading a target object located on a package.
FIG. 5B is a partial-sectional view of an imaging reader and boot, illustrating an imaging field-of-view and smart illumination projected on a target object.
FIG. 6 is an image of a smart illumination pattern projected by the imaging reader in FIG. 5A.

Referring now to FIGS. 1-4, the imaging reader 10 includes a handle 12, which is located between an upper end 14 and lower end 16 of the reader 10. The reader 10 further includes a head 18 situated between first and second ends 20 and 22, respectively. Extending from and connected to the reader head 18 is a boot 30. The boot 30, as discussed further in detail below, provides visually defined fixed and prescribed illumination pattern in a direction toward a target object 32, such as a bar code for imaging, as illustrated in FIG. 5A. The target object 32 in FIG. 5A is located on a package 34 and in addition to being any indicia form of symbology, the target object could also be located on any type of product or packaging.

An imager field-of-view FOV is projected from the imaging reader 10 as best seen in FIG. 5A and in the partial sectional view of the imaging reader in FIG. 5B. The imager FOV is the extent of the area imaged by the reader 10 and identified as area A in FIGS. 5A and 5B. In the illustrated embodiment of FIGS. 5A and 5B, the imager FOV extends beyond the outer limits $Z_1$ and $Z_2$ of the target object 32, however it could also reside within the outer limits $Z_1$ and $Z_2$ for certain symbology types and still successfully image the target object 32.

An illumination source 36 is located in the imaging reader 10 and in combination with the boot 30, projects smart illumination illustrated as an illumination pattern 38 identified by the area B in FIGS. 5A and 5B. In the illustrated embodiment, the imaging process is manually initiated by a trigger 40 located on the handle 12 of the imaging reader 10. When the trigger 40 is engaged, it enables the illumination from the illumination source 36 that is shaped by the boot 30 to form the illumination pattern 38. An operator when using the imaging reader 10, projects the illumination pattern 38 upon the target object 32. Automated image reader systems can also be used without departing from the spirit and scope of the claimed invention, which are initiated by an instruction internal to the reading system's software or circuitry. Alternatively, the initiation of the automatic reading system may be continuous once power is supplied to the reader. For either the manual or automatic reading systems, the illumination source 36 is energized, projecting the illumination through the boot 30 that shapes the illumination pattern 38 projected from the imaging reader 10.

The illumination pattern 38 is a prescribed pattern defined by the geometry of the boot 30. The illumination pattern 38 comprises an envelop distance $\psi$ located just beyond the imager FOV. In the illustrated example of FIG. 5B, the imager FOV is at an angle $\theta_A$ about an optical axis OA of the imaging reader 10. The illumination pattern 38 defined by the boot 30 provides a fixed angle $\theta_B$ about the optical axis OA. The boot 30 truncates light that would normally pass from the reader absent the boot and reallocates light into the illumination pattern 38 such that $$\psi = \theta_B - \theta_A$$

for all illumination patterns 38 relative to the imager FOV about the optical axis OA.

Figure 18:
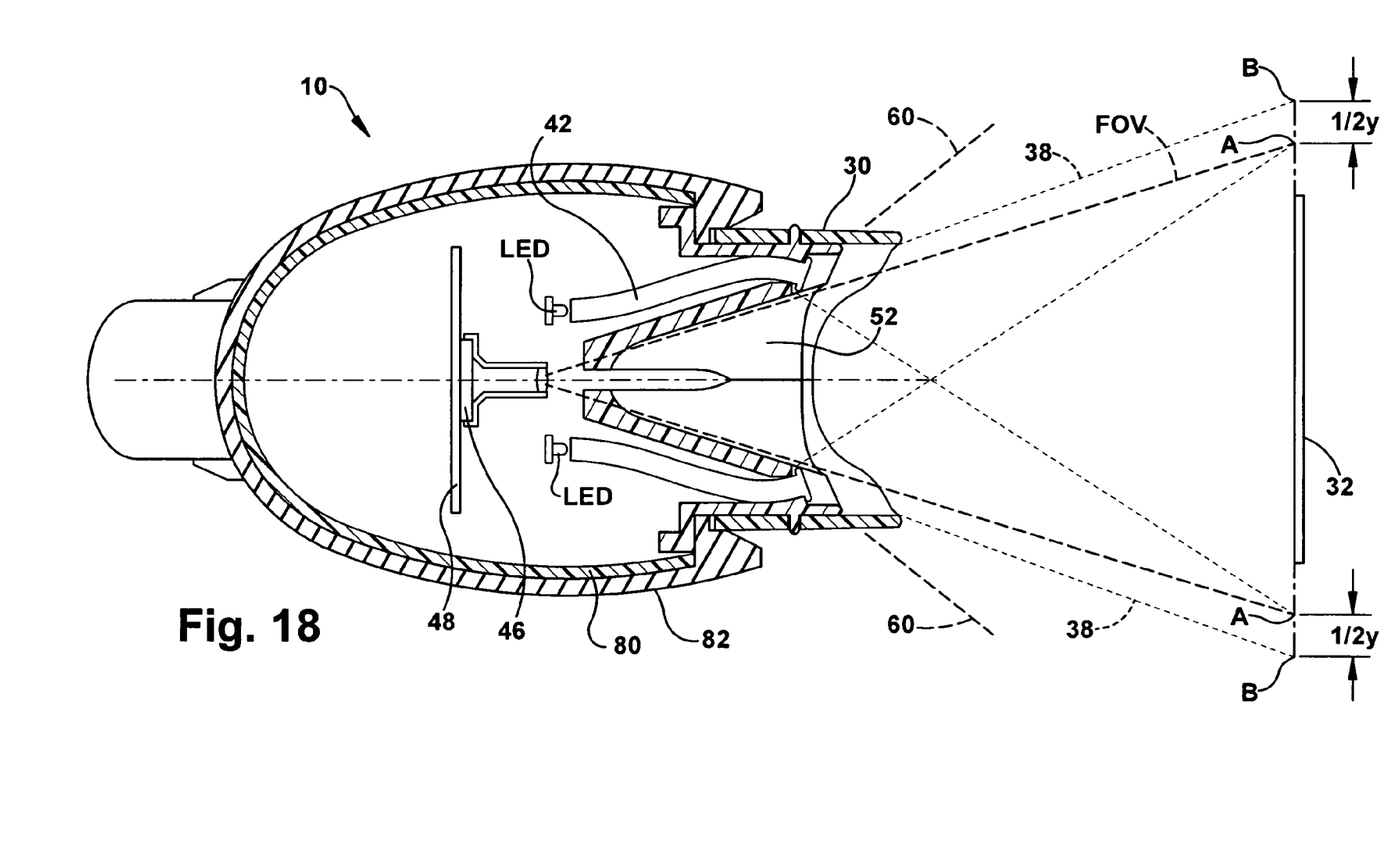
FIG. 18 is a sectional view of the imaging reader of FIG. 3 along section lines 18-18.
Figure 19:
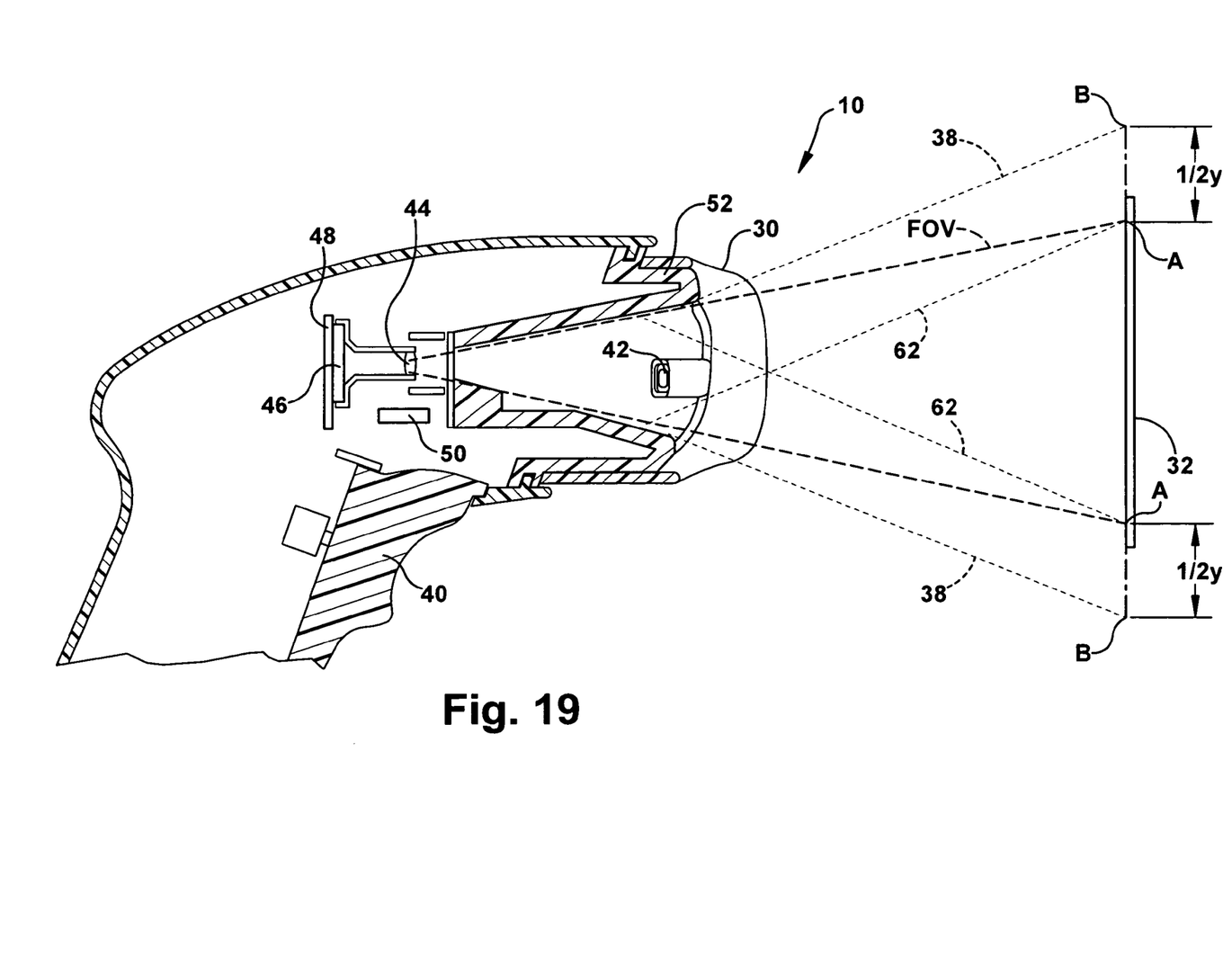
FIG. 19 is a sectional view of the imaging reader of FIG. 2 along section lines 19-19.

The illumination source 36 can be a single light emitting diode (LED), bank of LEDs, LEDs projecting light through a lens, a cold cathode lamp (CFL), or an LED projecting light through one or more light pipes 42 as illustrated in FIGS. 18 and 19. FIGS. 18 and 19 are sectional views of the imaging reader 10 for FIGS. 3 and 2, respectively.

Once the illumination pattern 38 is defined by the boot 30 and projected from the imaging reader 10, an image from the target object 32 is reflected back toward the imager into focusing optics 44 that includes a single or plurality of lenses. The focusing optics 44 then focuses the reflected image onto an imaging sensor 46, such as a multi-dimensional pixel array, filling the pixel array with data. The imaging sensor 46 is coupled to an imager positioned on a printed circuit board 48 (PCB). The imaging sensor produces a data grid corresponding to the reflected image from the target object 32. It should be appreciated by those skilled in the art that the imaging sensor 46 such as a pixel array and imager could be either a charged coupled device (CCD) or complementary metal oxide semiconductor (CMOS) based imaging type array, both having multi-dimensional array of sensors that sense the reflected image and form pixel data corresponding to the image of the target object 32.

An analog to digital ("A/D") converter is located on the PCB 48 receives the stored analog image from the imager. The A/D converter then sends a digital signal to a decoder located either on the PCB 48 or remotely from the imaging reader 10. The signal is then synthesized by the decoder's internal circuitry. The PCB 48 may further include a microprocessor that assists in processing and decoding the image into a data stream through software or firmware. The firmware and/or software includes computer readable media embedded within the microprocessor onto for example, flash Read Only Memory (ROMs) or as a binary image file that can be programmed by a user. Alternatively, the PCB could include an application specific integrated circuit (ASIC).

If the decode process executed within the decoder is successful, the decode session may be terminated with the decoded information being transmitted to an output of the PCB 48, which could be tied to a number of reader peripherals. The periperherals include for example, visual display devices such as a monitor or LED, a speaker, or the like. The imaging reader 10 could further include a laser diode 50 that assists by projecting an aiming pattern onto the target object 32. Further, a bezel diffuser 52 is illustrated in FIGS. 18 and 19 that assists in scattering the light from the illumination source 36.

The sectional views of FIGS. 18 and 19 further illustrate the truncating and reallocating of the illumination in the illumination pattern 38 shaped by the boot 30. In particular, it can be seen that the boot 30 clips or truncates the light beams 60 emitted from the light pipes 42 and instead, redirects the beams to be concentrated within the illumination pattern 38. For example, redirected light beams 62 are diffused within the boot 30 and projected upon the target object 32 within the illumination pattern 38. Accordingly, the illumination pattern 38 can assist the user in directing the gun toward the target object 32.

Figure 9:
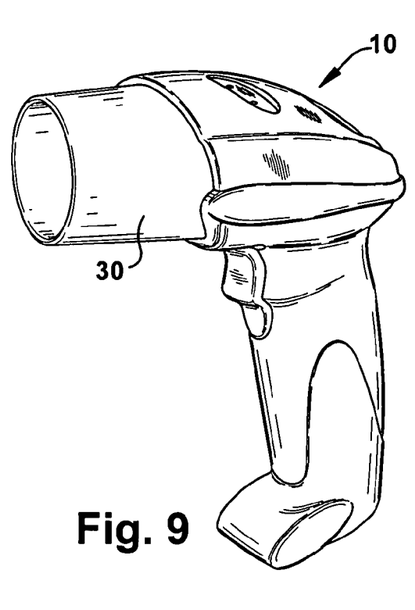
FIG. 9 is a perspective view of an imaging reader constructed in accordance with one embodiment of the disclosure.
Figure 10:
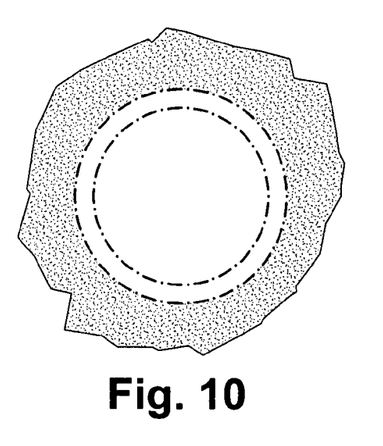
FIG. 10 is an image of a smart illumination pattern projected by the imaging reader in FIG. 9.
Figure 11:
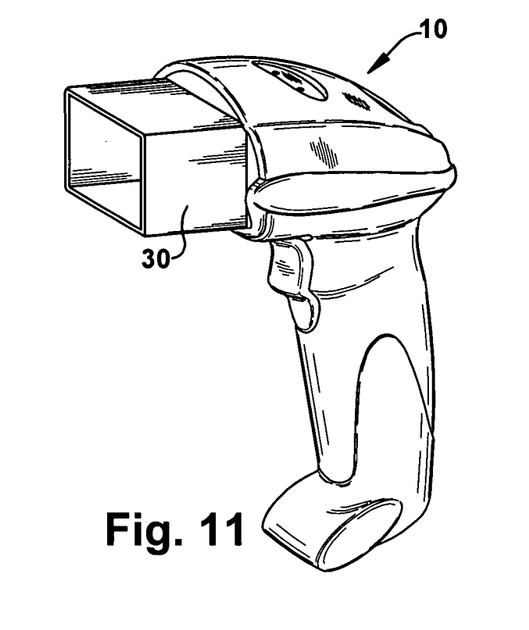
FIG. 11 is a perspective view of an imaging reader constructed in accordance with one embodiment of the disclosure.
Figure 12:
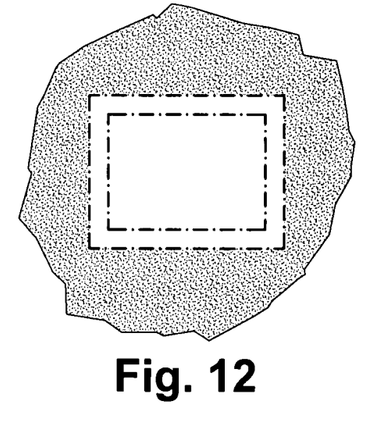
FIG. 12 is an image of a smart illumination pattern projected by the imaging reader in FIG. 11.

The boot 30 is made from any type of reflective or diffuse material. In the illustrated embodiments, the boot 30 is made from diffuse white plastic, such as thermoplastic TEXAN® 950 manufactured by Bayer MaterialScience LLC, of Pittsburg, Pa. The geometry of the boot 30 is reflected in the shape of the illumination pattern 38, producing a sharp light intensity boundary in which illumination is significantly reduced outside the boundary of the illumination pattern. Stated another way, the illumination pattern 38 can be shaped to reflect a desired geometry based on the configuration of the boot 30. For example, the oval-shaped boot 30 in FIG. 5A provides an oval-shaped illumination pattern 38 illustrated in FIG. 6, the round-shaped boot 30 in FIG. 9 provides round-shaped illumination pattern 38 illustrated in FIG. 10, the rectangular-shaped boot 30 in FIG. 11 provides a rectangular-shaped illumination pattern 38 illustrated in FIG. 12, and the boot 30 in FIG. 13 comprising left and right sides projects a sharp left and right contrast in the illumination pattern 38 of FIG. 14.

Figure 7:
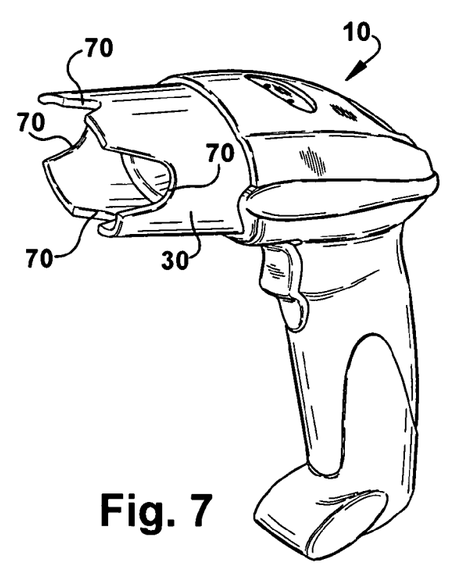
FIG. 7 is a perspective view of an imaging reader constructed in accordance with one embodiment of the disclosure.
Figure 8:
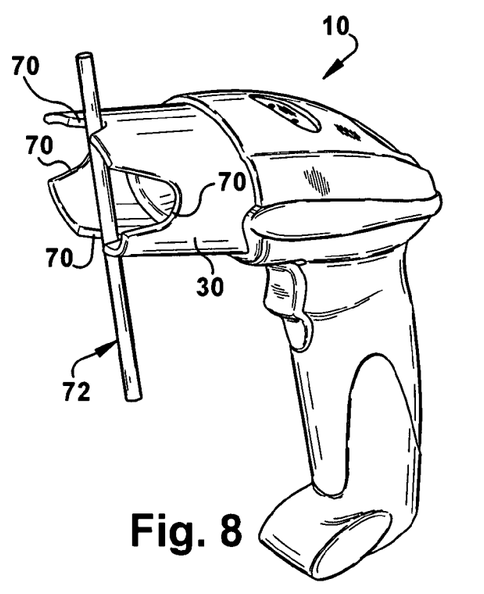
FIG. 8 is a perspective view of an object being scanned by the imaging reader of FIG. 7.
Figure 13:
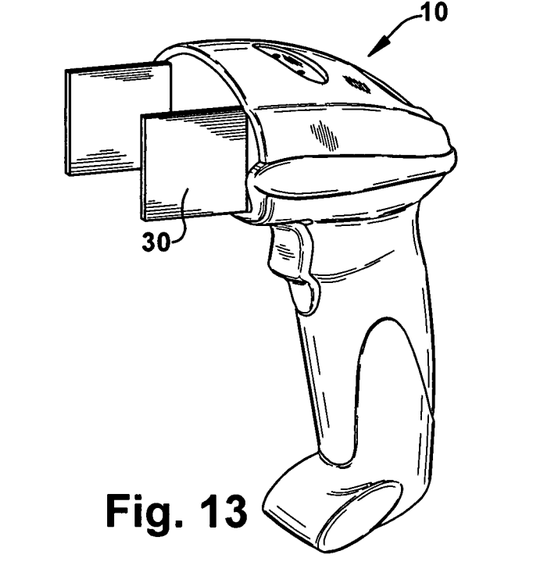
FIG. 13 is a perspective view of an imaging reader constructed in accordance with one embodiment of the disclosure.
Figure 14:
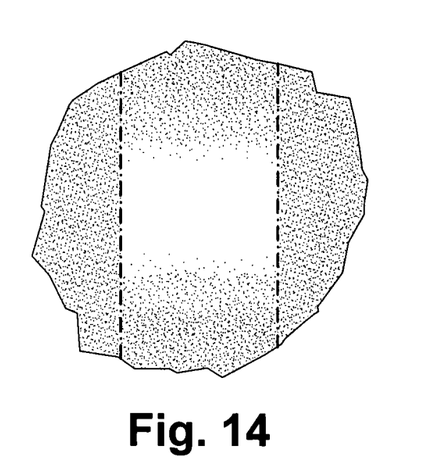
FIG. 14 is an image of a smart illumination pattern projected by the imaging reader in FIG. 13.

In addition to shaping the illumination pattern 38, the boot 30 can be used to position a package or object during imaging, as illustrated in FIGS. 7 and 8. The boot 30 in the illustrated embodiment of FIGS. 7 and 8 includes a plurality of slots 70 for guiding and supporting an object 72 during imaging, such as a tube. Further, the boot 30 could include an upper recess 74 illustrated in FIGS. 1-4 to allow the user of a handheld image reader 10 in close proximity scans to see over the reader and view the target object 32 and/or illumination pattern 38. A corresponding lower recess 74' is provided symmetrically about the OA so that the illumination pattern 38 is uniform along its upper and lower profiles. The illustrated embodiment of FIG. 13 provides additional viewing clearance for the user by constructing the boot 30 to have only left and right sides.

Figure 15:
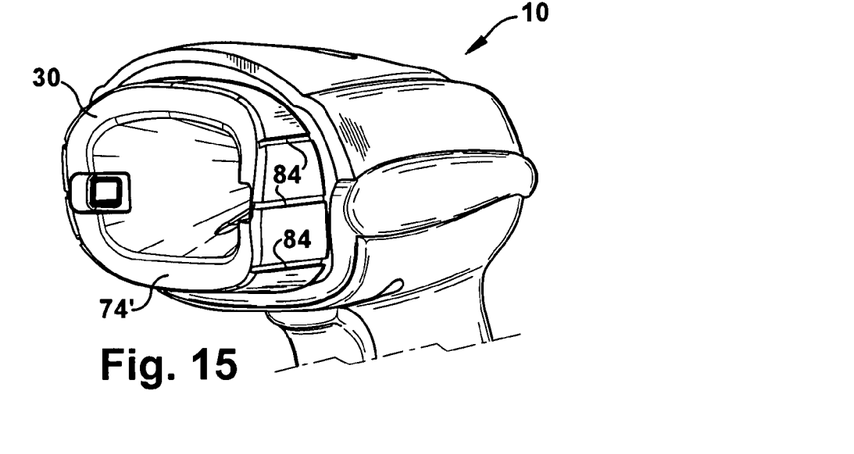
FIG. 15 is a perspective view of one example embodiment of a boot attached to an imaging reader.
Figure 16:
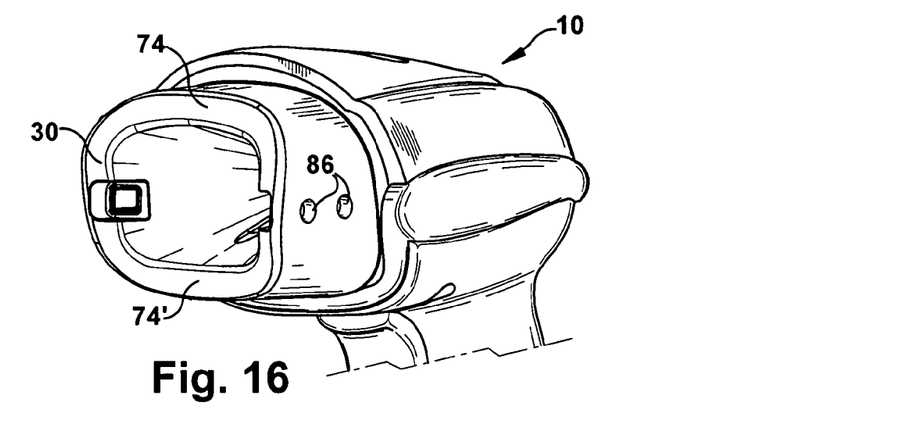
FIG. 16 is a perspective view of one example embodiment of a boot attached to an imaging reader.
Figure 17:
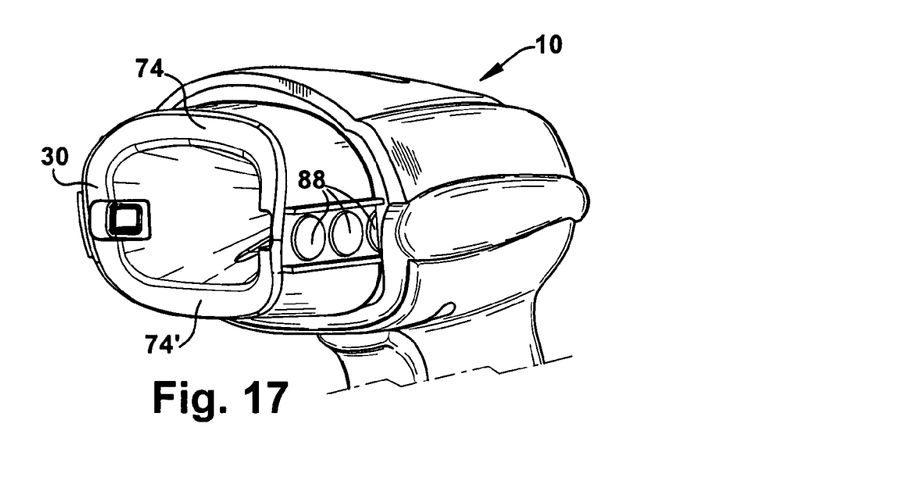
FIG. 17 is a perspective view of one example embodiment of a boot attached to an imaging reader.

Referring again to FIGS. 18 and 19, the imaging reader 10 includes a housing 80 surrounded by overmolded rubber 82. The boot 30 can be integrally connected to the housing 80, or be detachably connected so that different sizes can be used to accommodate different imager FOVs and imaging applications. For example, FIGS. 15-17 illustrate three different example embodiments of a detachable boot 30. In FIG. 15, the boot 30 comprises a plurality of slots 84 about its perimeters that engage a corresponding boss (not shown) located in the housing 80 of the imaging reader 10. The slots allow for the amount of extension of the boot 30 beyond the head 18.

In an alternative example embodiment illustrated in FIG. 16, the boot 30 includes a plurality of apertures 86 that can be selected for adjusting the depth by engaging at least one aperture with a corresponding boss (not shown) located within the housing 80 of the imaging reader 10. Further, the multiple apertures 86 can be used to engage more than one corresponding boss to facilitate additional support and an anti-rotation connection. In yet another alternative example embodiment illustrated in FIG. 17, the boot 30 includes a number of bosses 88 where at least one is selectively received by a corresponding recess (not shown) in the housing 80, allowing adjustment to the amount of extension of the boot beyond the head 18.

Figure 20:
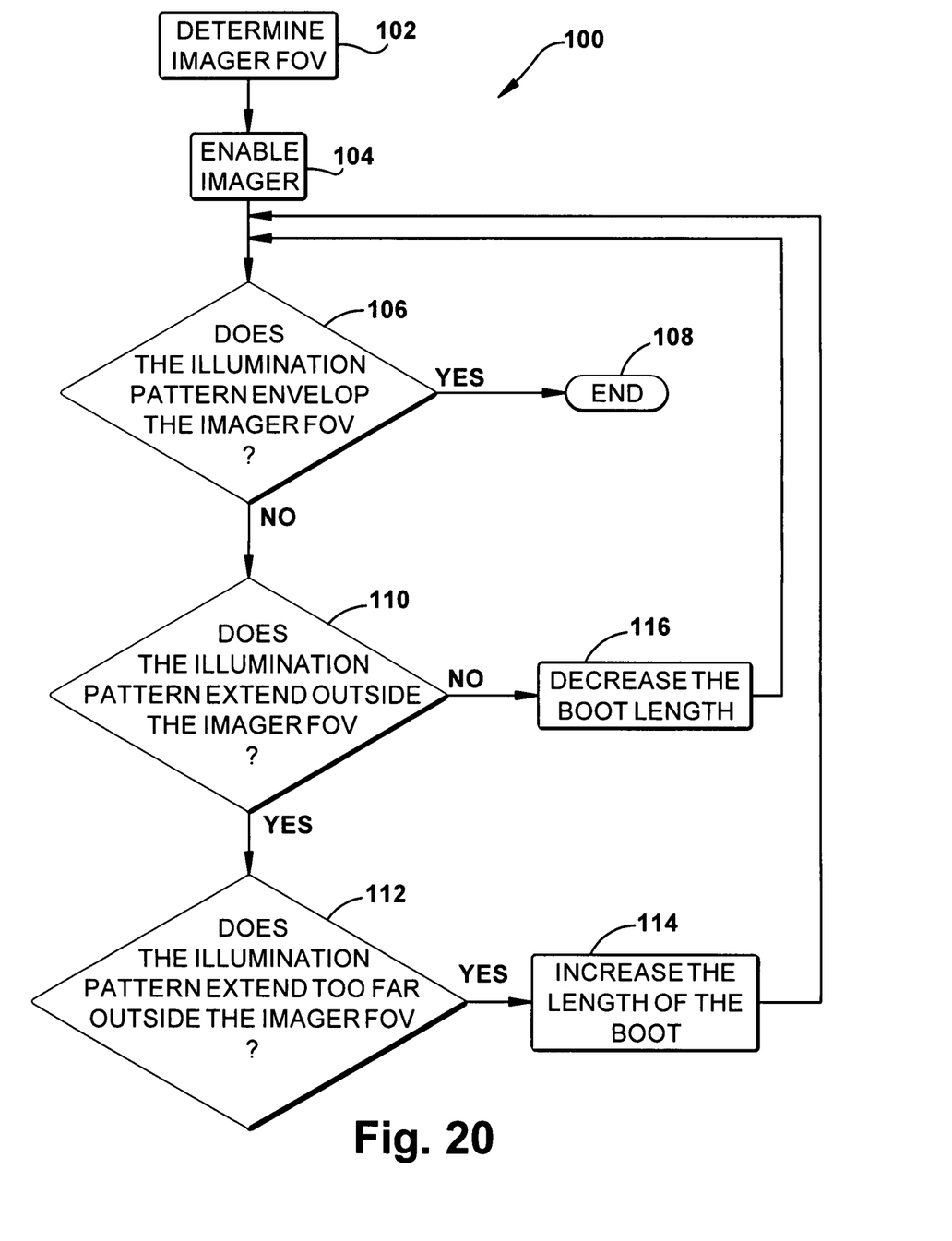
FIG. 20 is block diagram illustrating an imaging process using smart illumination in an imaging reader.

FIG. 20 illustrates a process 100 for using and adjusting an imaging reader 10 having a boot 30 for projecting an illumination pattern 38. The amount of adjustment of the boot is along the distance X illustrated in FIG. 5B. At 102, the imager FOV is determined. At 104, the imaging reader is enabled. At 106, a determination is made on whether the illumination pattern enveloped the imager FOV. If the determination at 106 is an affirmative, the process ends at 108. If the determination at 106 is negative, a determination is made at 110. The determination at 110 is whether the illumination pattern extends outside the imager FOV. If the determination at 110 is an affirmative, a determination is made at 112. The determination at 112 is whether the illumination pattern extends too far outside the imager FOV. If the determination at 112 is an affirmative, the length of the boot should be increased at 114 and the process is repeated at step 106. If the determination at 112 is negative, the process is repeated as at step 106. If the determination at 110 is negative, the length of the boot should be decreased at 116 and the process is repeated at step 106.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:
1. An imaging assembly adapted for reading a target object, the imaging assembly comprising:
   a scan engine comprising a sensor, focusing optics, and an imager, the scan engine having a scan engine field-of-view defining an area to be imaged by the imaging assembly;

a housing internally lodging said scan engine and an illumination source, the illumination source adapted to project illumination from the housing; and a boot extending from said housing and made from non-transparent material operative to truncate light from the illumination source that projects towards the outside of said scan engine field-of-view while allowing light from the illumination source projecting towards said scan engine field-of-view to pass through an opening of the boot to form an illumination pattern from said illumination, the illumination pattern substantially conforming to a geometrical shape of said boot and specifying an outer boundary of said scan engine field-of-view with the illumination pattern having a shape substantially identical to the shape of said scan engine field-of-view.

2. The imaging assembly of claim 1 wherein said boot and housing form a unitary construction.

3. The imaging assembly of claim 1 wherein said boot is adjustably connected to said housing.

4. The imaging assembly of claim 1 wherein said illumination pattern provides a fixed envelop distance of less than one millimeter about at least a portion of the perimeter of the scan engine field-of-view.

5. The imaging assembly of claim 4 wherein said fixed envelop distance is substantially uniform about the perimeter of said scan engine field-of-view and said illumination pattern.

6. The imaging assembly of claim 1 further comprising an optical axis extending from said imaging assembly such that said scan engine field-of-view provides a first angle about said optical axis and said illumination pattern provides a second angle about said optical axis wherein said first angle is less than said second angle.

7. The imaging assembly of claim 1 wherein said illumination pattern provides a fixed envelop distance substantially equal independent of varying distances between the imaging assembly and the target object.

8. The imaging assembly of claim 1 wherein said illumination pattern envelops the entire perimeter of said scan engine field-of-view.

9. The imaging assembly of claim 1 wherein said boot is constructed of light diffusing material.

10. The imaging assembly of claim 1 wherein said boot is constructed of diffusing white plastic.

11. The imaging assembly of claim 1 wherein said boot includes at least one recess.

12. The imaging assembly of claim 1 wherein said boot is circular.

13. The imaging assembly of claim 1 wherein said boot is non-circular.

14. The imaging assembly of claim 1 wherein said boot includes an arcute relief section along at least a portion of the boot to allow for unobstructed viewing by the operator during the operation of the imaging assembly.

15. A method of imaging a target object comprising:
creating a scan engine field-of-view for a scan engine located in a housing of an imaging assembly;
projecting illumination from an illumination source located within said housing to a location outside of said housing by passing the illumination through a boot extending from the housing;
truncating light from the illumination source that projects towards the outside of said scan engine field-of-view while allowing light from the illumination source projecting towards said scan engine field-of-view to pass through an opening of the boot to form an illumination pattern as it passes through the boot made from non-transparent material, the illumination pattern having a substantially similar shape as the boot and specifying an outer boundary of said scan engine field-of-view with the illumination pattern having a shape substantially identical to the shape of said scan engine field-of-view; and
enveloping the field-of-view with said illumination pattern such that said illumination pattern is at a fixed offset location relative to said field-of-view.

16. The method of imaging a target object of claim 15 further comprising providing an arcute relief section along at least a portion of the boot to allow for unobstructed viewing by the operator during the operation of the imaging assembly.

17. A method of imaging a target object comprising:
projecting an imaging field-of-view from a scan engine located in a housing of an imaging assembly;
projecting illumination from an illumination means located within said housing to a location outside of said housing by passing the illumination through a baffling means extending from the housing;
truncating light from the illumination means that projects towards the outside of said scan engine field-of-view while allowing light from the illumination means projecting towards said scan engine field-of-view to pass through an opening of the boot to form an illumination pattern as it passes through said baffling means made from non-transparent material, the illumination pattern having a substantially similar shape as the baffling means and specifying an outer boundary of said imaging field-of-view with the illumination pattern having a shape substantially identical to the shape of imaging field-of-view; and
enveloping the field-of-view with said illumination pattern such that said illumination pattern is at a fixed offset location relative to said field-of-view.

18. A hand-held image scanner used for reading target objects comprising:
a scan engine comprising a sensor and imager, the scan engine having a scan engine field-of-view defining an area to be imaged by the image scanner;
a housing internally lodging said scan engine and an illumination source, the illumination source being adapted to project illumination from the housing;
a boot extending from the housing and made from non-transparent material operative to truncate light from the illumination source that projects towards the outside of said scan engine field-of-view while allowing light from the illumination source projecting towards said scan engine field-of-view to pass through an opening of the boot to form an illumination pattern from said illumination, the illumination pattern substantially conforming to a geometrical shape of said boot and specifying an outer boundary of said scan engine field-of-view with the illumination pattern having a shape substantially identical to the shape of said scan engine field-of-view; the illumination pattern forming a fixed envelop distance about at least a portion of the perimeter of said scan engine field-of-view.

19. The hand-held image scanner of claim 18 wherein said illumination pattern envelops the entire perimeter of said scan engine field-of-view.

20. The hand-held image scanner of claim 18 further comprising an optical axis extending from said image scanner such that said scan engine field-of-view provides a first angle about said optical axis and said illumination pattern provides a second angle about said optical axis wherein the difference between the second angle and said first angle is constant and independent of the position between the image scanner and a target object.

* * * * *